United States Patent [19]

Hasegawa et al.

[11] Patent Number: 4,814,653

[45] Date of Patent: Mar. 21, 1989

[54] DEVICE FOR AIR COOLING BEARING OF HERMETIC DYNAMIC MACHINE

[75] Inventors: Nobuo Hasegawa; Eiichi Okuyama, both of Hitachi, Japan

[73] Assignee: Hitachi, Ltd., Tokyo, Japan

[21] Appl. No.: 133,358

[22] Filed: Dec. 15, 1987

[51] Int. Cl.⁴ ............................ H02K 9/06; H02K 7/08
[52] U.S. Cl. ........................................ 310/90; 310/62; 310/89; 384/321; 384/476
[58] Field of Search ................. 74/606 A; 310/58, 59, 310/62, 63, 64, 89, 90; 384/320, 321, 476, 900; 417/369

[56] References Cited

U.S. PATENT DOCUMENTS

| | | | |
|---|---|---|---|
| 2,394,517 | 2/1946 | Ingalls | 417/369 |
| 2,680,001 | 6/1954 | Batt | 384/321 |

Primary Examiner—Patrick R. Salce
Assistant Examiner—D. L. Rebsch
Attorney, Agent, or Firm—Antonelli, Terry & Wands

[57] ABSTRACT

A hermetic dynamic machine has a main part supporting a rotor shaft and having a main part cooler, an external fan provided on one end of the rotor shaft, an end cover which covers the end of the main part adjacent to the external fan and having a cooling air inlet formed therein, a bearing provided on the portion of the rotor shaft adjacent to the external fan. The dynamic machine further has a cooling air system which is constituted by a first cooling air passage for guiding the flow of the cooling air from the air inlet to the external fan, a second cooling air passage through which air for cooling the bearing flows and a third cooling air passage through which cooling air from the external fan is introduced into the main part cooler. A first connecting pipe provides a communication between the first and second cooling air passages, while a second connecting pipe provides communication between the second and third cooling air passages. Part of air induced by the external fan through the cooling air inlet is introduced into the second cooling air passage through the first connecting pipe for cooling the bearing. The air after cooling the bearing merges through the second connecting pipe into the cooling air in the third cooling air passage so as to take part in cooling main part of the machine.

14 Claims, 2 Drawing Sheets

DEVICE FOR AIR COOLING BEARING OF HERMETIC DYNAMIC MACHINE

BACKGROUND OF THE INVENTION

The present invention relates to a hermetic dynamic machine.

Japanese Utility Model Laid-Open No. 55-78825 discloses a hermetic dynamic machine having an external cooling fan which is composed of two fan blade systems: one for cooling the machine body and the other for bearings. When compared with earlier proposals, this arrangement suffers from problems such as increased mechanical loss, reduced efficiency of the machine, complicated construction of the cooling fan and increased size and cost of the whole machine, due to the additional provision of the fan blade system specifically intended for cooling the bearings.

More specifically, referring to FIG. 4, the hermetic dynamic machine disclosed in Japanese Utility Model Laid-Open No. 55-78825 has a rotor shaft 104 which is provided on the top end thereof with an external fan 106. The rotor shaft 104 also carries a dynamic machine part 102 which is provided with a cooler 108. The end of the dynamic machine with the external fan 106 is covered by an end cover 110 which is provided with a cooling air inlet 118. The end of the rotor shaft 104 adjacent to the external fan 106 is supported by a bearing 128 which is housed in a bearing box 130. The external fan 106 is provided with blades which are composed of main part cooling blades 106a and bearing cooling blades 106b. In operation, cooling air is induced from the air inlet 118 by the suction force produced by the main part cooling blades 106a of the external fan 106. The thus induced cooling air is made to flow through a main part cooling air passage 142 and then through the cooler 108 so as to effectively cool the main part 102 of the hermetic dynamic machine. A part of the air flowing through the main part cooling air passage 142 exits therefrom into a bearing cooling air passage 140 which is provided at the inlet end thereof with a flow-rate adjusting damper 148, by the suction force produced by the bearing cooling blades 106b. This air flows along the bearing box 130 so as to effectively cool the bearing 128 in the bearing box 130.

As stated before, no consideration has been given in this arrangement for obviating various shortcomings attributable to the increase in the size of the external fan 106 and the increase in the mechanical loss. Namely, the cost of the external fan is raised because of the complicated construction and increased size of the external fan, which leads to a rise in the cost and an increase in the size of the whole machine, as well as decreased efficiency of the same.

SUMMARY OF THE INVENTION

Accordingly, an object of the present invention is to provide a hermetic dynamic machine equipped with an external fan of a reduced size, thereby overcoming the above-described problems of the prior art.

To this end, according to the present invention, there is provided a hermetic dynamic machine comprising: a main part of the dynamic machine having a rotor shaft; an external fan provided on the end of the rotor shaft; a main part cooler provided in the main part of the dynamic machine; an end cover which covers the end of the main part adjacent to the external fan; a cooling air inlet formed in the end cover; a bearing provided on the portion of the rotor shaft adjacent to the external fan; a first cooling air passage for guiding the flow of the cooling air from the air inlet to the external fan; a second cooling air passage through which air for cooling the bearing flows; a third cooling air passage through which cooling air from the external fan is introduced to the main part cooler; first connecting pipe means providing a communication between the first and second cooling air passages; and second connecting pipe means providing communication between the second and third cooling air passages; whereby part of air induced by the external fan through the cooling air inlet is used for cooling the bearing.

Thus, in the hermetic dynamic machine of the present invention, part of the air induced into the first cooling air passage by the external fan through the inlet is forced into the third cooling air passage so as to reach the main part cooler thereby cooling the main part of the machine, while the remainder part of air induced by the external fan through the cooling air inlet is introduced into the second cooling air passage through the first connecting pipe for cooling the bearing. The air after cooling the bearing merges through the second connecting pipe in the cooling air in the third cooling air passage so as to take part in the cooling of the main part of the machine.

It is therefore possible to eliminate the necessity for the double fan blade system required in the prior art machine, so that the size of the external fan is reduced, which in turn takes it possible to reduce the mechanical loss so as to attain a higher efficiency of the machine. The temperature rise of the air caused by cooling the bearing is only a small fraction of that caused by the cooling of the main part of the machine, so that the temperature of the cooling air after cooling the bearing is low enough to provide a sufficient cooling effect on the main part of the machine.

DESCRIPTION OF THE PREFERRED EMBODIMENTS

Figure 1:
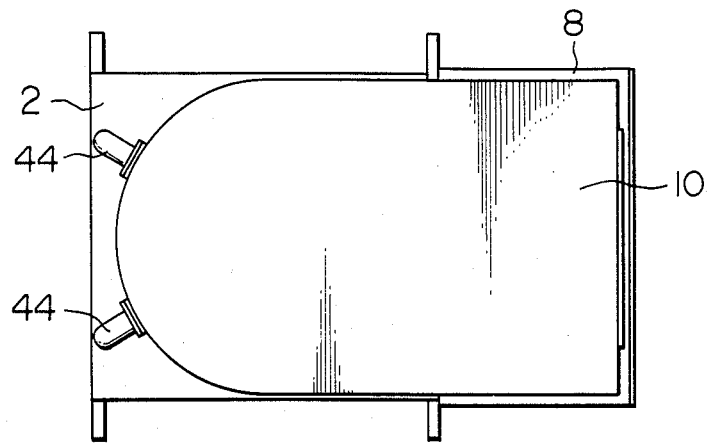
FIG. 1 is a plan view of a hermetic dynamic machine as an embodiment of the present invention.
Figure 2:
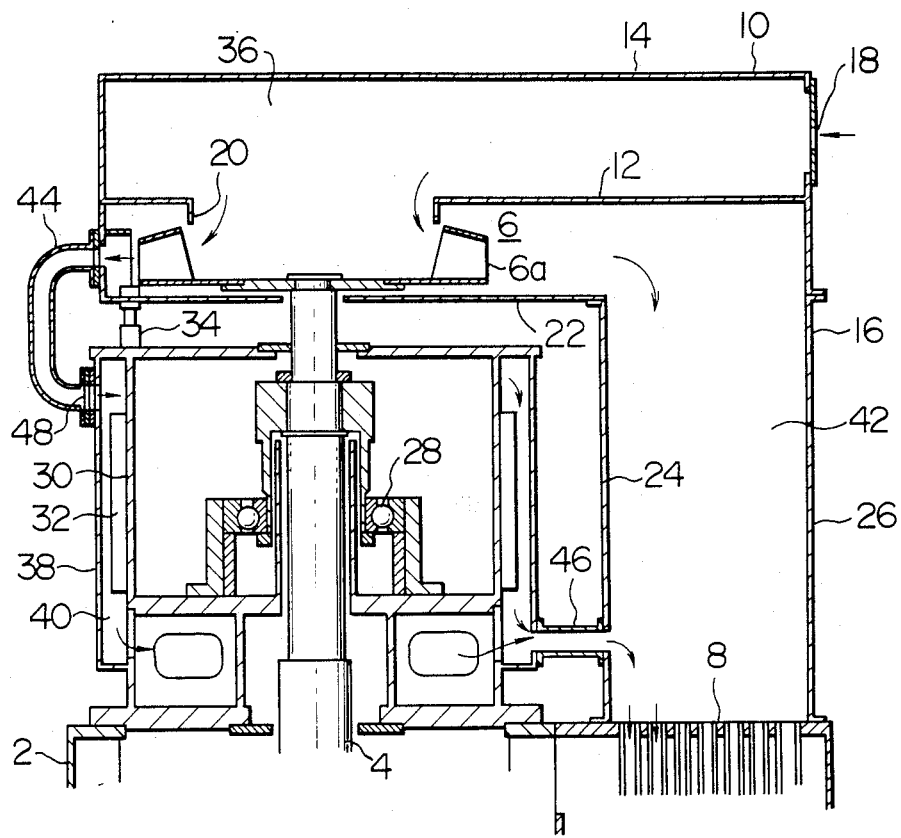
FIG. 2 is a vertical sectional view of an essential portion of the hermetic dynamic machine as shown in FIG. 1.
Figure 3:
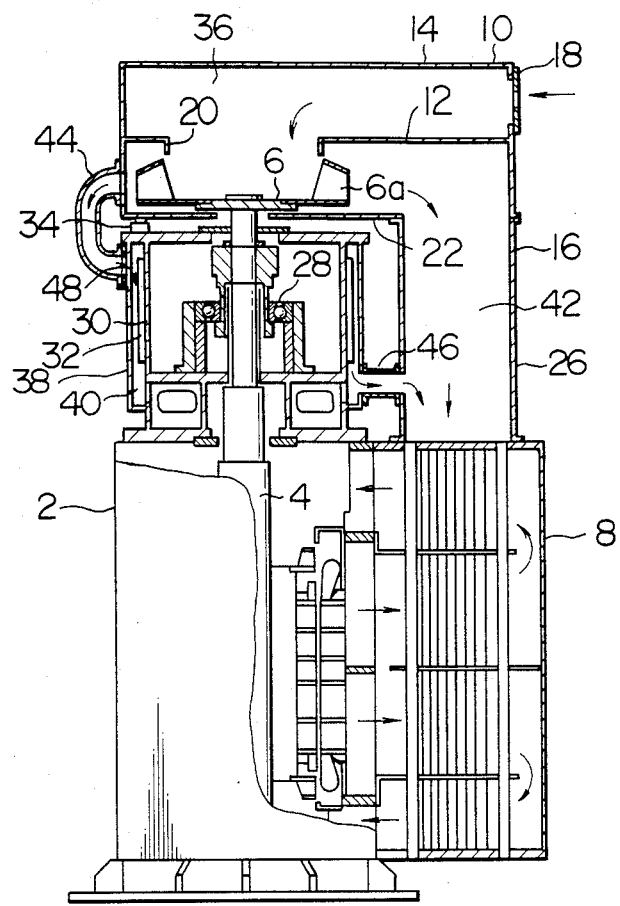
FIG. 3 is a vertical sectional view of the whole of the hermetic dynamic machine as shown in FIG. 1.
Figure 4:
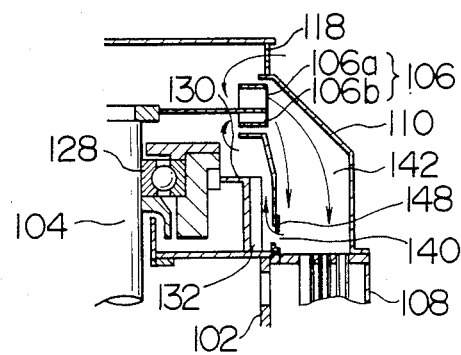
FIG. 4 is a vertical sectional view of an essential portion of a known hermetic dynamic machine.

Referring to FIGS. 1 to 3, a hermetic dynamic machine embodying the present invention includes a main part 2 having a rotor shaft 4, an external fan 6 provided on the upper end of the rotor shaft 4, a main part cooler 8 provided in the main part 2 and an end cover 10 which covers the end of the main part 2 adjacent to the external fan 6. The external fan 6 has fan blades 6a on the upper side thereof. The end cover 10 has a partition wall 12 immediately above the external fan 6, an upper portion 14 on the upper side of the partition wall 12 and a lower portion 16 on the lower side of the partition wall 12. The upper portion 14 is provided with a cooling air inlet 18 through which cooling air is induced by the external fan 6. The partition wall 12 is provided with a circular opening 20 which confronts the external fan 6. The lower portion 16 of the end cover 10 has a horizontal plate 22 immediately below the external fan 6, a vertical wall portion 24 which extends vertically downwardly from the end of the horizontal plate 22 so as to be connected to the upper end of the main part 2 of the dynamic machine or the upper end of the main part cooler 8, and another vertical wall portion 26 which extends downward from the end of the partition wall 12 and connected to the upper end surface of the main part cooler 8.

The hermetic dynamic machine of the present invention further has a bearing 28 which is provided on an end portion of the rotor shaft, 4 adjacent to the external fan 6, and a bearing box 30 which houses the bearing 28. The bearing box 30 is provided with cooling fins 32 on its external surface. The bearing box 30 supports the left portion of the end cover 10 by means of a support 34.

The upper portion 14 of the end cover 10 and the partition wall 12 define therebetween a first cooling air passage 36 through which the cooling air is introduced from the cooling air inlet 18 to the cooling fan 6. A cover 38 defining a second bearing cooling air passage 40 is provided so as to surround the bearing box 30. The second cooling air passage 40 for cooling air which cools the bearing 28 is formed between this cover 38 and the bearing box 30. The partition wall 12, vertical wall 24, vertical wall 26 and the upper surface of the main part cooler 8 cooperate in defining a third cooling air passage 42 through which the cooling air from the external fan 6 is introduced to the main part cooler 8.

The hermetic dynamic machine further has first connecting pipes 44, 44 which are connected at their one ends to the lower portion 16 of the end cover 10 near the horizontal plate 22 thereof and connected at their other ends to the cover 38 which defines the bearing cooling air passage. Thus, the first connecting pipes 44, 44 provide communication between the first cooling air passage 36 through which the cooling air induced from the outer side flows and the second cooling air passage 40 for the air intended for cooling the bearing 28. The hermetic dynamic machine further has a second connecting pipe 46 provided in the vicinity of the main part 2 of the dynamic machine. The second connecting pipe 46 has one end connected to the cover 38 defining the second cooling air passage and the other end connected to the vertical wall 24 of the end cover 10. Thus, the second connecting pipe 46 provides a communication between the second cooling air passage 40 through which the air for cooling the bearing 28 flows and the third cooling air passage 42 through which the cooling air from the first cooling air passage 36 is directed towards the main part cooler 8. Although there are two first connecting pipes in the illustrated embodiment, this is only illustrative and the hermetic dynamic machine of the invention can have only one first connecting pipe arranged in the manner described above. Anyway, the total cross-sectional area of the first connecting pipes 44, 44, i.e., the total rate of air flowing out of the first connecting pipes 44, 44, is greater than that of the second connecting pipe 46 so that any tendency for the air to reverse from the third cooling air passage 42 back into the second cooling air passage 40 is prevented.

As will be clearly understood from FIG. 2, the second cooling air passage 40 is isolated from the first and the third cooling air passages 36, 42 except for the communication provided by the first and the second connectings pipes 44, 44, 46.

Thus, the second cooling air passage 40 for the cooling air which cools the bearing 28 is communicated at its one side with the first cooling air passage 36 through which the air from the air inlet 18 is induced by the external fan 6 and at its other end with the third cooling air passage 42 through which the cooling air from the external fan 6 is directed to the main part cooler 8. According to this arrangement, therefore, part of the air induced by the external fan 6 through the air inlet 18 can effectively be utilized for the purpose of cooling the bearing 28, without requiring the double arrangement of the fan blade systems used in connection with the prior art. Namely, in contrast to the prior art which employs two fan blade systems: one for cooling the main part of the machine and the other for cooling the bearing, the hermetic dynamic machine of the present invention can enjoy an equivalent cooling effect by an external fan 6 which is provided with only one blade system, i.e., the fan blades 6a. In consequence, the size of the external fan 6 is reduced as compared with that in the prior art machine.

In operation, the cooling air from the external fan 6 flows as indicated by arrows in FIG. 2. Namely, the air induced by the external fan 6 first flows into the first cooling air passage 36 through the air inlet 18 formed in the end cover 10. Part of this air is directed to the third cooling air passage 42, while the other part of the air is introduced into the first connecting pipes 44. The air introduced into the third cooling air passage 42 flows through the main part cooler 8 so as to cool the air inside the main part 2 of the hermetic dynamic machine and is then discharged to the outside of the machine. Meanwhile, the air forced into the first connecting pipes 44, 44 is made to flow through the bearing cooling air passage, i.e., the second cooling air passage 40, so as to carry heat away from the surface of the bearing box 30 and the cooling fins 32 formed on this surface and is then made to flow through the second connecting pipe 46 so as to merge in the air flowing in the third cooling air passage 42 so as to enhance the effect of cooling of the air inside the main part 2 of the machine. The flow rate of air introduced into the second cooling air passage 40 is controlled by means of a flow rate controlling damper 48.

As will be understood from the foregoing description, in the hermetic dynamic machine of the present invention, both the main part of the machine and the bearing are effectively cooled by a single blade system 6a of the external fan and the air after cooling the bearing is effectively used also in the cooling of the main part of the machine. In consequence, the size of the external fan 6 is reduced to attain about 18% reduction in the mechanical loss and about 0.3% increase in the efficiency of the dynamic machine, as compared with the prior art machine which employs an external fan having a double blade system. The use of the external fan having a simplified construction with a single blade system also makes it possible to standardize the design of the external fan. The simplified construction of the external fan also offers an advantage from the economical point of view, considering that the cost of the mold for producing the external fan 6 is about 8 times as high as the cost of the fan 6 itself, when the external fan 6 is made of a non-ferrous material.

Thus, the present invention makes it possible to simplify the construction of the external fan while reducing the size of the same, which in turn brings about various other advantages.

What is claimed is:

1. A hermetic dynamic machine comprising:

a main part of the dynamic machine having a rotor shaft;

an external fan provided on one end of the rotor shaft which extends outwardly from said main part;

a main part cooler provided in said main part of the dynamic machine;

an end cover which covers the external fan and the end of said main part adjacent to said external fan;

a cooling air inlet formed in said end cover;

a bearing provided on the portion of said rotor shaft located outwardly from said main part and adjacent to said external fan;

a first cooling air passage for guiding the flow of the cooling air from said air inlet to said external fan;

a second cooling air passage through which air for cooling said bearing flows;

a third cooling air passage through which cooling air from said external fan is introduced to said main part cooler;

first connecting pipe means providing a communication between said first and second cooling air passages; and second connecting pipe means providing communication between said second and third cooling air passages;

whereby part of air induced by said external fan through said cooling air inlet is used for cooling the bearing.

2. A hermetic dynamic machine according to claim 1, wherein said external fan has a single blade system.

3. A hermetic dynamic machine according to claim 1, further comprising a bearing box which houses said bearing and a cover provided around said bearing box so as to surround said bearing box, said second cooling air passage being formed between said cover and said bearing box over essentially the full axial extent of said bearing box.

4. A hermetic dynamic machine according to claim 1, wherein said end cover includes a partition wall, an upper portion above said partition wall and a lower portion below said partition wall, said first cooling air passage being defined by said upper portion and said partition wall.

5. A hermetic dynamic machine according to claim 1, wherein said end cover includes a partition wall, an upper portion above said partition wall and a lower portion below said partition wall, said third cooling air passage being defined by said lower portion and said partition wall.

6. A hermetic dynamic machine according to claim 1, wherein said first and second connecting pipe means are sized and designed that the cross-sectional area of said second connecting pipe means is smaller than that of said first connecting pipe means.

7. A hermetic dynamic machine according to claim 1, wherein said second connecting pipe means is connected to said third cooling air passage at a portion in the vicinity of said main part of said machine.

8. A hermetic dynamic machine comprising:

a main part of the dynamic machine having a rotor shaft;

an external fan provided on one end of the rotor shaft which extends outwardly from said main part;

a main part cooler provided in said part of the dynamic machine;

an end cover which covers the external fan and the end of said main part adjacent to said external fan;

a cooling air inlet formed in said end cover;

a bearing provided on the portion of said rotor shaft located outwardly from said main part and adjacent to said external fan;

a first cooling air passage for guiding the flow of the cooling air from said air inlet to said external fan;

a second cooling air passage through which air for cooling said bearing flows;

a third cooling air passage through which cooling air from said external fan is introduced to said main part cooler, said third cooling air passage being isolated from said first and second cooling air passages through atmospheric air;

first connecting pipe means providing a communication between said first and second cooling air passages; and second connecting pipe means providing communication between said second and third cooling air passages;

whereby part of air induced by said external fan through said cooling air inlet is used for cooling the bearing.

9. A hermetic dynamic machine according to claim 8, further comprising a bearing box which houses said bearing and a cover provided around said bearing box so as to surround said bearing box, said second cooling air passage being formed between said cover and said bearing box over essentially the full axial extent of said bearing box.

10. A hermetic dynamic machine according to claim 8, wherein said external fan has a single blade system.

11. A hermetic dynamic machine according to claim 8, wherein said end cover includes a partition wall, an upper portion above said partition wall and a lower portion below said partition wall, said first cooling air passage being defined by said upper portion and said partition wall.

12. A hermetic dynamic machine according to claim 8, wherein said end cover includes a partition wall, an upper portion above said partition wall and a lower portion below said partition wall, said third cooling air passage being defined by said lower portion and said partition wall.

13. A hermetic dynamic machine according to claim 8, wherein said first and second connecting pipe means are so sized and designed that the cross-sectional area of said second connecting pipe means is smaller than that of said first connecting pipe means.

14. A hermetic dynamic machine according to claim 8, wherein said second connecting pipe means is connected to said third cooling air passage at a portion in the vicinity of said main part of said machine.

* * * * *

UNITED STATES PATENT AND TRADEMARK OFFICE
CERTIFICATE OF CORRECTION

PATENT NO. : 4,814,653

DATED : Mar. 21, 1989

INVENTOR(S) : Hasegawa et al.

It is certified that error appears in the above-identified patent and that said Letters Patent is hereby corrected as shown below:

Please insert the priority data that has been erroneously omitted from the front page of this patent.

Japanese Patent Application No. 61-311441, filed in Japan December 30, 1986.

Signed and Sealed this

Thirtieth Day of January, 1990

Attest:

JEFFREY M. SAMUELS

Attesting Officer     Acting Commissioner of Patents and Trademarks